Dec. 14, 1937.  J. WETSTEIN  2,102,398
MEANS FOR PREPARING A LIQUID
Original Filed Nov. 25, 1930  2 Sheets-Sheet 1
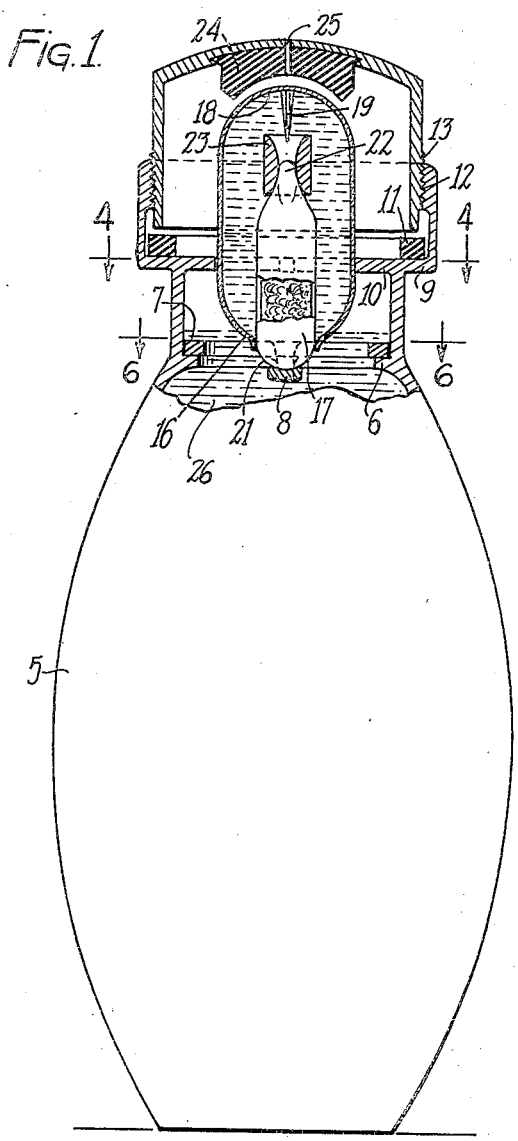
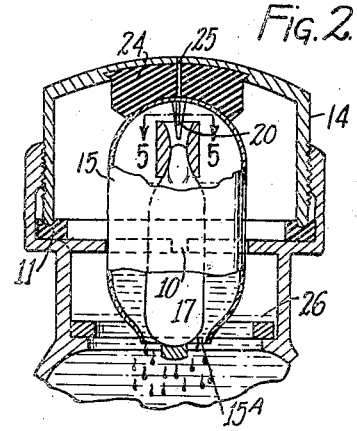
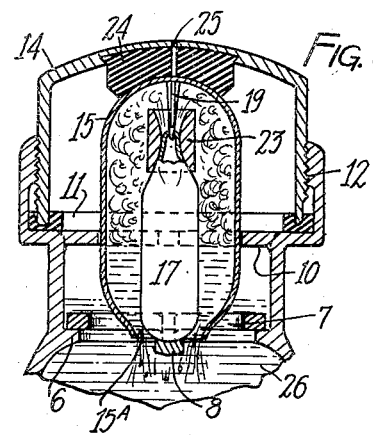
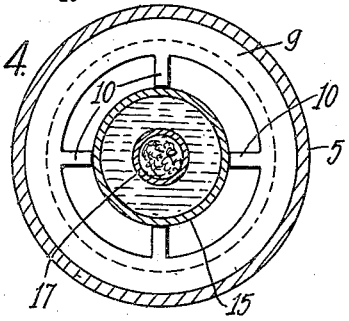
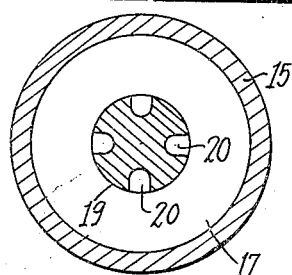
INVENTOR.
JACOB WETSTEIN, DECEASED,
BY ERNA KORN AND
FLORENCE W. WINTERS, EXECUTRICES
BY John J. Lynch
ATTORNEY.

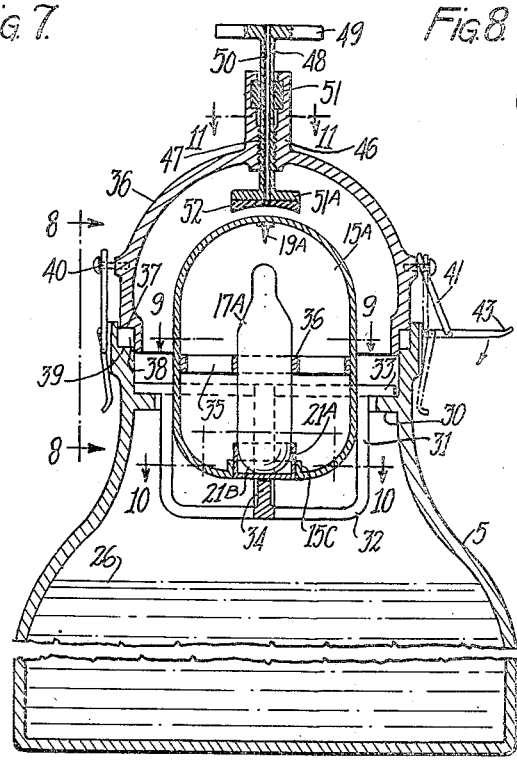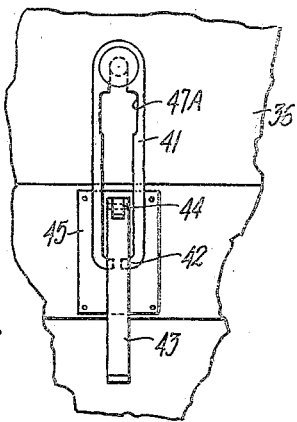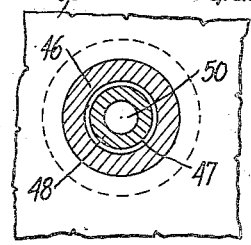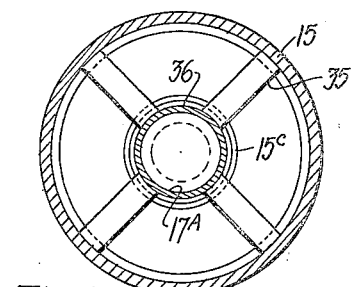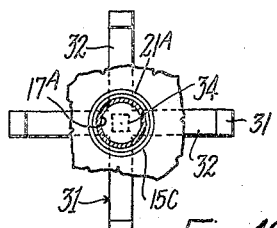

Patented Dec. 14, 1937

2,102,398

UNITED STATES PATENT OFFICE 2,102,398

MEANS FOR PREPARING A LIQUID

Jacob Wetstein, deceased, late of New York, N. Y., by Florence W. Winters and Erna Korn, executrices, New York, N. Y.

Original application March 31, 1932, Serial No. 602,378, which is a continuation of Serial No. 498,095, November 25, 1930. Divided and this application November 21, 1935, Serial No. 50,954. In Canada and Great Britain November 25, 1931

6 Claims. (Cl. 225—18)

This invention relates to a means for preparing a liquid by the use of a combination member which consists of a cartridge in which is contained a drink ingredient and carbon dioxide gas, the cartridge being made in two parts, an inner gas cartridge and a drink ingredient shell which holds the gas cartridge, the shell being arranged to be forced off the gas cartridge to release the ingredient which is blown out by release of the gas, all as set forth in application Serial No. 602,378, the divisional matter in this application relating particularly to a bottle-like receptacle in which the refill unit is held and operated upon by manipulation of parts of said bottle.

The particular object of the invention is to provide a bottle in which a carbonated beverage can be made by the use of a refill member containing a drink ingredient and a gas, which provides means for the proper support of the refill, permits movement of the parts of the bottle to separate the parts of the refill to permit charging of the liquid contents of the bottle and subsequent release of the top pressure caused by the release of the gas, so that the bottle can be opened without the contents boiling over the top thereof.

The invention also reduces the cost incident to the use of glass bottles in which beverages are usually sold in that it entirely eliminates the glass bottle, the necessity of sterilizing the same, and the cost of shipment to and from a bottling plant.

With these and other objects in view, the invention comprises the construction, combination and arrangement of parts as hereinafter described and then particularly pointed out in the appended claims.

In the drawings:—

Figure 1 is a view in elevation, partly in section, showing how the invention is employed in the production of a carbonated beverage.

Figure 2 is a view in sectional elevation of the upper end of the bottle or receptacle showing how an initial movement of the bottle cap will act on the refill unit.

Figure 3 is a view similar to Figure 2, showing the effect of a still further movement of the bottle cap on the refill member to cause release of the gas and complete charging of the bottle contents.

Figure 4 is a section taken on the line 4—4 of Figure 1 and shows the means for holding the refill unit in upright position.

Figure 5 is a section taken on the line 5—5 of Figure 2 and shows, enlarged, the slotted pin employed in piercing the gas cartridge upon movement of the bottle cap.

Figure 6 is a section taken on the line 6—6 of Figure 1 illustrating the refill holding device used in the upper part of the bottle.

Figure 7 is a view in section of a different form of construction as applied to the upper part of the bottle.

Figure 8 is an enlarged section taken on the line 8—8 of Figure 7 showing the cap fastening means.

Figure 9 is a section taken on the line 9—9 of Figure 7 showing the means for supporting the gas cartridge within the refill unit.

Figure 10 is a section taken on the line 10—10 of Figure 7 showing the means for supporting the refill member by the use of a bridge, and Figure 11 is an enlarged section taken on the line 11—11 of Figure 7 showing the construction of the plunger and its vent means.

This application is a division of application Serial No. 602,378, now Patent No. 2,073,273, dated March 9, 1937, which in turn is a continuing application of Serial No. 498,095 filed November 25, 1930.

Referring to the drawings in detail, 5 indicates a liquid receptacle of bottle shape of any contour desired and preferably made from non-corrosive metal. The bottle is provided with an inwardly extending flange 6 adjacent its open end for the support of the bridge disk 7, whose center strap 8 is concave and acts as a self-centering and supporting agent for the refill member, to be later referred to.

The receptacle or bottle 5 is provided with a shoulder 9 and extended lips 10, the latter of which constitute centering fingers for the refill member. The shoulder 9 constitutes a seat for the cap washer 11 which is preferably of soft compressible material such as rubber which will effectively seal the space between the lower edge of the cap and the shoulder 9 of the receptacle.

The upper end of the receptacle is internally threaded as at 12 to receive the threaded portion 13 of a cap 14. This cap, preferably made from the same material as the bottle itself, may be knurled, ribbed or otherwise roughened on its outer surface to provide a hand hold.

The refill member consists of an outer drink ingredient holding shell 15, the open end of which is constricted as at 16 and arranged to be closed by the insertion therein of the gas cartridge 17. The upper end of the shell at 18 has on its inside the piercing pin 19 which, as seen in Figure 5, has slots or flutes 20 which permit escape of gas from the gas cartridge 17 when the end of said cartridge is pierced by the pin. The lower end 21 of the cartridge extends slightly beyond the lower end of the shell 15 and rests on the bridge 8 of the support ring 7. The cap 14 at the center thereof and on its inner top surface has a compressible washer or rubber pad 24 which, as well as the top or cap 14, is provided with a central bore 25 constituting a vent opening for the release of the top gas pressure when the contents of the refill member have been released into the bottle.

It is believed that a full description of the operation is necessary in using the bottle to prepare a drink and the first step is the placing of the refill member into the bottle 5 so that it is in the position shown in Figure 1. The cap 14 is then threaded into positions illustrated in Figures 2 and 3 to successively force the shell 15 off the cartridge 17 and cause the cartridge to be pierced by the pin 19 so that the carbon dioxide gas will escape and will force the drink ingredient into the liquid 26 to be prepared. When the cap 14 is threaded down, the washer 24 engages the outer surface of the shell 15 with the result that the vent 25 is sealed and continued threading movement of the cap 14 forces the shell down to carry out the operation previously described in making the drink. The release of the gas will, besides charging the liquid 26, create a top pressure, which must be relieved gradually and without the conscious effort of the person using the device so that when the cap 14 is finally removed there will be no boiling over of the contents of the bottle 5 which would occur if the cap was removed suddenly. To accomplish this, the vent 25 is employed and an initial unthreading movement of the cap will separate the washer 24 and the outer surface of the shell 15 because the latter has moved downwardly and will have no retractile movement thus permitting the gas to escape before the lower edge of the cap 14 leaves the washer 11.

In the modified form of the device as shown in Figures 7 to 11 inclusive, the receptacle 5 is provided with an annular ledge 30 upon which is positioned a bridge 31 constituting a support for the refill unit and also a guide when the same is positioned in the receptacle. This bridge consists of the depending arms 32, the upper ends of which are turned over as at 33 to rest on the ledge 30 while the depending portions 32 at their central meeting point are provided with an upstanding cartridge rest 34, upon which is supported the cartridge cup 21A which is forcibly fitted over the curved end 21B of the gas cartridge 17A. The lower end of shell 15A is provided with an inwardly flanged opening, the flange 15c of which frictionally holds the cup 21A therein so that the closed end of the cup is flush with the outer surface of the cup 15A which holds the liquid to be forced, by the gas when the latter is released from the cartridge, into the liquid to be prepared. This shell 15A may be provided with a guide ring 35 positioned in any suitable manner therein so that the central ring 36 thereof holds the cartridge 17A in upright position so that the piercing pin 19A in the shell 15A will properly pierce the cartridge.

The cup 21A also serves as a guide in properly supporting the cartridge when it is being pierced. The receptacle 5 in which the liquid 26 to be prepared is held, is closed at its upper end through the medium of a cap 36 flanged at its lower end as at 37 to fit over a gasket 38 positioned on a ledge 39 at the upper end of the receptacle 5. In order to quickly secure or remove the cap 36 the same has been provided with headed pins 40 at the opposite sides thereof, or at any desired points on the periphery thereof which are arranged to be engaged by the yoke link 41, in each instance, which is pivoted as at 42 to the latching hasp arm 43 pivoted as at 44, to an extension or ear formed on a plate 45, secured in any suitable manner adjacent the upper end of the receptacle 5. The pivot point 44 of the hasp arm 43, being above the pivot point 42 of the link 41, will cause, when the hasp arm is drawn down in the position indicated in outline in Figure 7, by the arrow, a tightening of the cap against the gasket 38 and the hasp will act as a latch and will prevent accidental removal or loosening of the cap 36 when once the fastening device has been secured as illustrated. Release of the cap is accomplished by raising the arms 43 until the openings 47A of arms 41 will pass over the heads of the pins 40.

The means for releasing the top gas pressure after the formation of the drink, consists of a sleeve 46 formed integrally with the cap 36, and in which is threaded as at 47, a plunger shaft 48, the upper end of which is formed to provide a handle 49 and the plunger shaft itself is provided with a hollow bore 50 constituting a vent.

The plunger passes through the sleeve 46, and through a packing gland 51 which prevents leakage. The plunger at its lower end and inside the cap 36, is provided with a plunger plate 51A, the underside of which is covered with a compressible seating gasket 52 or rubber pad, the vent 50 passing through the gasket and the plunger plate.

A downward movement of the plunger will bring the gasket into contact with the outer surface of the shell 15A, to seal the vent 50 and continued movement of the plunger will force the shell 15A off the cup 21A to release the drink ingredient and thereafter the pin 19A will pierce the gas cartridge 17A and the drink will be made. A reverse threading movement to unscrew the plunger and raise it, will separate the gasket and the shell and uncover the vent with the result that the top gas pressure will be relieved and the cap may be removed without danger of the drink being spoiled by the boiling over of the bottle contents.

It is evident that there has been disclosed a novel container for use with a refill member which uses a part of the member to seal a gas pressure vent and in which a good drink can be compounded in a few moments without exposure of the contents and in a perfectly sanitary manner.

The invention is not to be restricted to the precise details of construction shown since various changes and modifications may be made therein without departing from the scope of the invention or sacrificing the advantages derived from its use.

What is claimed is:

1. In a receptacle, in combination, a refill member including a gas cartridge, a holder for the cartridge, and means in the holder for piercing the cartridge, a movable cover for the container, arranged to engage and move said holder, a container sealing gasket engaged by the lower edge of the cover, a vent gasket secured to the cover and interposed between said holder and cover, the cover and vent gasket having a vent arranged to be sealed by engagement of the vent gasket and holder, and said vent gasket being arranged to disengage said holder and open the vent before the cover disengages said sealing gasket upon a movement of the cover away from said holder.

2. In a liquid receptacle, in combination, a refill unit including relatively moveable parts, a support for said refill member, a top member on the receptacle arranged to engage the refill member to relatively move the parts thereof to open said refill member, said top member having a gas vent therein arranged to be sealed by engagement of said top member with the refill member during relative movement of the parts of the refill member and means for retracting said top member for separation from said refill member to uncover the vent preparatory to opening the receptacle.

3. In a liquid container arranged to hold a refill unit including relatively movable parts, a cover for the container, a plunger in the cover movable to engage the unit to relatively move the parts thereof to release gas to charge liquid in the container, said plunger having a vent for releasing the gas pressure in the container, said vent being arranged to be closed by the unit when the plunger is in engagement therewith, and latching means for detachably securing the cover in place on the container.

4. In a liquid container arranged to hold a refill unit including relatively movable parts, a bridge removably positioned in the container and constituting a support and guide in which the unit is held, a cover for the container, a plunger in the cover movable to engage the unit to relatively move the parts thereof, said plunger having a vent for releasing the gas pressure in the container, said vent being arranged to be closed by the unit when the plunger is in engagement therewith and the vent opened by retractile movement of the plunger.

5. In a device of the character described, a liquid container having positioned therein a refill member including a gas cartridge and a drink ingredient holder in which the cartridge is positioned, said holder being movable relatively to the cartridge to open a discharge outlet for the contents of both, a cover on the container, a gasket carried by the cover, said cover and gasket having a vent opening therein, means for moving the gasket into and out of contact with the refill member, the continued movement of the said gasket after contact causing movement of the cartridge and holder whereby the drink ingredient and gas from the cartridge may charge liquid in the container, and said gasket movement out of contact causing release of the gas pressure in the top of the container after the liquid in said container has been charged with the gas and the drink ingredient.

6. In combination with a liquid receptacle, a refill unit including relatively movable parts, a movable cover for the receptacle, a support for the unit, a gasket carried by the cover and positioned between the cover and the refill unit, said cover and gasket having a vent therein arranged to be sealed when the gasket engages the unit, the said parts being arranged to be moved relatively to each other by such engagement, to cause release of gas from the unit, said vent being arranged to relieve the gas pressure in the receptacle when the gasket is moved out of contact with said unit by the cover.

FLORENCE W. WINTERS,
ERNA KORN,
Executrices of the Estate of Jacob Wetstein, Deceased.